Dec. 13, 1960 D. S. CARY 2,964,636

OPTICALLY IMMERSED PHOTOCONDUCTIVE CELLS

Filed June 5, 1956

Donald S. Cary
INVENTOR.

BY Daniel I. Mayne, F. M. Emerson Holmes

ATTORNEYS 2,964,636

OPTICALLY IMMERSED PHOTOCONDUCTIVE CELLS

Donald S. Cary, Rochester, N.Y., assignor to Eastman Kodak Company, Rochester, N.Y., a corporation of New Jersey Filed June 5, 1956, Ser. No. 589,535

8 Claims. (Cl. 250—211)

Figure 1:
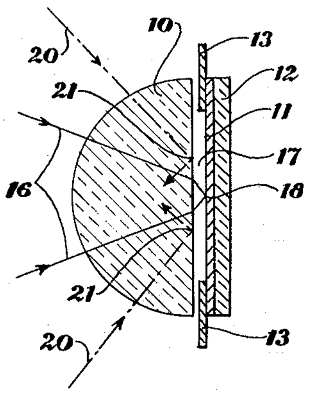

This invention relates to photoconductive detectors such as lead selenide or lead sulfide cells, particularly those produced by chemical deposition on the surface of an insulator such as glass.

The present invention is particularly useful with lead sulfide cells produced by the methods described in copending applications Serial Nos. 276,798 Hammar and Bennett, 276,799 Glassey and 276,800 Sugarman, all filed March 15, 1952, and all now abandoned.

The object of the invention is to increase the effective sensitivity of such cells where "sensitivity" is defined as signal-to-noise ratio which is, of course, the customarily accepted definition. This increase in sensitivity is gained by the optical immersion principle wherein the photoconductive surface is in optical contact with one surface of a lens. Optical contact permits radiation from any angle to reach the photosensitive surface and the lens itself acts as the final unit in the optical system colletcing the radiation for the cell. As will be pointed out below in connection with the drawings, the invention increases the apparent size of the cell and thus the sensitive surface.

The advantages gained by optical immersion increase with higher indices of refraction. Accordingly, it is desirable to utilize high index materials as the lens in the present invention. However, all high index materials are not compatible with lead sulfide or lead selenide surfaces and may tend either immediately or in due course to cause the sensitivity of the cell to deteriorate. Furthermore, all high index materials are not suitable to act as the receiving surface in the chemical deposition processes described in the above-mentioned copending applications. Furthermore, the high index material must be such that a suitable lens can be manufactured therefrom which will withstand normal atmospheric conditions.

I have found two materials similar to each other in many respects which satisfy these requirements and which provide more than a doubling of the sensitivity of the photoconductive cells. The two materials are crystalline titanium dioxide (rutile) and crystalline strontium titanate. These materials are commercially available and are chemically inert to the solutions used in the deposition of the lead sulfide or lead selenide photosensitive film. Both materials have high transmission virtually free of absorption from the middle of the visual range far out into the infrared, out to 5½ microns in the case of rutile and out to 6 microns in the case of strontium titanate. The thermal expansion coefficients range between $7\times10^{-6}$ and $9.4\times10^{-6}$, which is about the same as common glass. Rutile has a hardness of 7 and strontium titanate has a hardness of 6.5 on the mho scale, which are similar to quartz.

The high melting point of these materials facilitates the use of soldering procedures for attaching electric wires to the electrodes which are deposited in contact with the photoconductive surface. The electrodes themselves are customarily applied by vacuum coating techniques.

The front surface of the lens may be provided with an anti-reflection layer so as further to increase the flux gathering power of the system. The unit as a whole is a lens with a convex or light collecting front surface and a photoconductive layer (with suitable electrodes) in optical contact with the rear surface which preferably is plano. There is no point in matching a curved image field since the need for sharp definition in a light integrating system exists only at the margins; the axial parts may be out of focus. The axial thickness of this convex-plano lens is preferably between .9 and 2.0 times the radius of curvature of the front surface in order to utilize to the full the optical efficiency gained by the invention.

Figure 2:
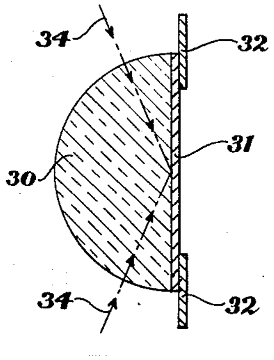

In the accompanying drawing:

Figs. 1 and 2 are schematic cross sections to illustrate the optical immersion feature of the invention.

Figure 3:
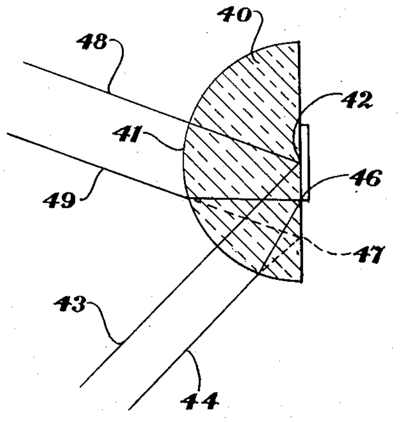
Figure 4:
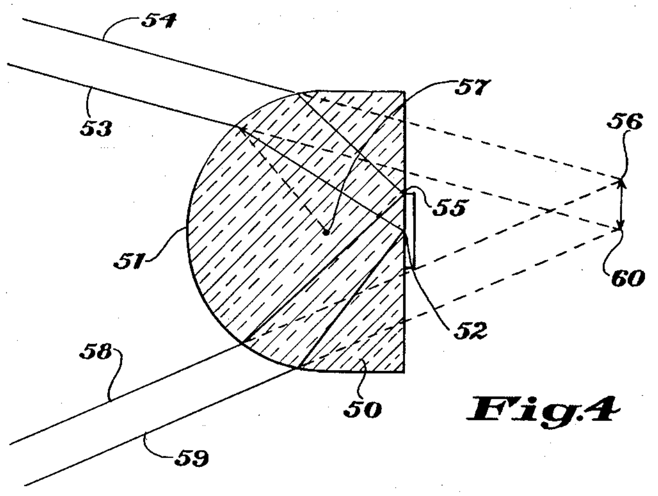

Figs. 3 and 4 respectively illustrate the "concentric" and "aplanatic" embodiments of the invention and also illustrate the magnification feature of the invention which provides the increased sensitivity.

Figure 5:
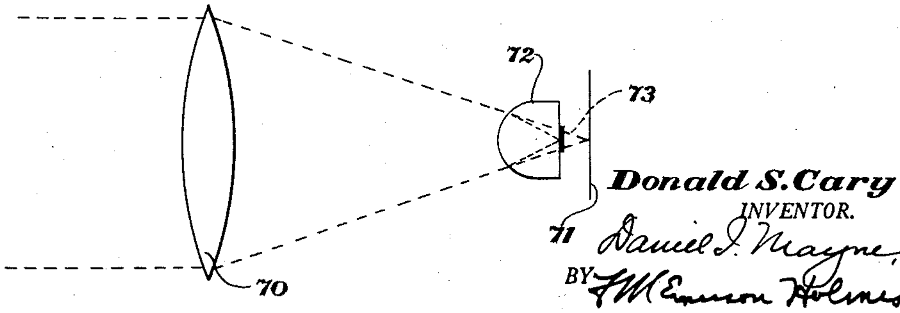

Fig. 5 similarly illustrates a complete optical system incorporating the invention.

In Fig. 1 a lens 10 is positioned in front of a photoconductive surface 11 which is mounted on a glass plate 12 and provided with electrodes 13. The cone of radiation represented by rays 16 passes through the lens 10 and into the air space 17 between the lens 10 and the photoconductive surface 11 eventually striking the photoconductive surface at the point 18.

However, more oblique rays beyond the so-called critical angle represented by broken lines 20 enter the lens 10 but are totally reflected at the points 21 on the rear surface of the lens so that none of this radiation reaches the photoconductive surface. Thus, only a relatively small cone of radiation actually is utilized by the photoconductive unit. In Fig. 2, on the other hand, the lens 30 has the photoconductive surface 31 coated in intimate contact with the back surface thereof. Even highly oblique rays 34 reach the photoconductive surface 31 since there is no air space at which total internal reflection can take place. The degree of concentration of the radiation at the cell depends on the index of refraction and accordingly the lens 30, in the present invention, is made of rutile or crystalline strontium titanate, which have high refractive indices in the infrared.

Rutile is birefringent and at 4 microns wave length has an index of refraction for the ordinary ray of 2.35 and for the extra-ordinary ray of 2.53. Strontium titanate, at 3.51 microns has an index of refraction of 2.21 and at 4.26 microns has an index of refraction of 2.17. The transmission of rutile 0.6 mm. thick, according to published data corrected for surface reflections, is well above 90% from .5 to 5.0 microns. The same is true for strontium titanate 1 mm. thick. Both materials are practically 100% transmitting between 2 and 4 microns wave length.

The actual gain in sensitivity is approximately proportional to N, the index of refraction of the lens. As will be discussed below in connection with two species of the invention, a certain size cell is made to appear larger by a magnification factor approximately equal to N and the density of radiation on the cell is increased by a factor of about $N^2$. Due to the actual smaller size of the cell for any given image size, the noise for equivalent operating conditions has also been increased by a factor of N (the magnification) and hence the net gain is $N^2/N$ which equals N. This all applies to the concentric species shown in Fig. 3. The factor for the aplanatic species (Fig. 4) is even higher since the magnification is about $N^2$ and the increase in radiation density is about $N^4$ in this case which gives a useful increase in sensitivity of about $N^2$.

Two useful lens configurations applied to the immersion of photoconductive detectors are given in Figs. 3 and 4. Fig. 3 represents the so-called concentric case where the detector is optically contacted to a plano surface passing through the center of curvature 42 of the front collecting surface 41 of a lens 40 with refractive index N. Two rays 43 and 48 from a preceding optical collection system (not shown) are directed toward a focus in a plane in which the cell is located. The center of the cell at 42 is also the "virtual" object in this case. These rays 43 and 48 pass through the front surface 41 without refraction. Two other relays 44 and 49 directed toward the edge 47 of the apparent or virtual cell (located in the focus plane) are refracted and converge to an image at 46, which is the edge of the actual cell. Therefore, the radiation which would have been distributed over a cell whose apparent half height is from 42 to 47 is now condensed onto a cell with a half height from 42 to 46. The resulting increase in radiation density for small cells is $N^2$ although the apparent cell and its image remain in the same plane. The image quality is relatively good since this lens element 40 is free from spherical aberration, coma, and longitudinal chromatic aberration. Although this lens is afflicted with astigmatism and lateral color, these are not serious in radiation collecting systems.

Fig. 4 represents the so-called aplanatic case where additional collecting power results from refraction of the incoming light, even for the rays forming an image on axis. The collecting surface 51 has its center of curvature at 57. The detector is in optical contact with a plano surface at a distance $R/N$ behind the center of curvature, where R is the radius of curvature of surface 51 and N the refractive index of the lens. In this case two rays from a preceding collecting system (not shown) converging to a virtual object point 60 on axis at a distance RN behind the center of curvature are refracted to form an image at 52 in the image plane. Two off-axis rays converging to a virtual object point 56 at the edge of a virtual cell are refracted and form an image at 55 at the edge of the real cell. The radiation density in this case is increased by a factor of $N^4$, although the cell and its image no longer are coplanar. This lens element introduces no additional spherical aberration, coma, or astigmatism to the system although there will be additional longitudinal and lateral color.

In both cases the preceding collecting system may be a simple positive lens or a concave mirror. The present invention is concerned only with what happens at the image plane. Fig. 5 shows a complete system, 70 being the collecting system focusing an image in a plane 71. A lens 72 according to the present invention concentrates this light on a photoconductive cell 73 which may be at or in front of the plane 71.

In those cases in which the front surfaces of the lens is not quite spherical (although there is little advantage in using aspherical surfaces) the radius of curvature is taken as that at the axis.

I claim:

1. A photosensitive unit comprising a lens, the front surface of which is convex, a photoconductive layer in optical contact with the rear surface of the lens and electrodes engaging the photoconductive layer, said lens being of a high index crystalline material selected from the group consisting of crystalline titanium dioxide and crystalline strontium titanate, the photoconductive layer consisting essentially of a lead salt selected from the group consisting of lead sulfide and lead selenide.

2. A photosensitive unit according to claim 1 in which the axial thickness of the lens is between .9 and 2 times the radius of curvature of the convex front surface at the axis.

3. A photosensitive unit according to claim 1 in which the axial thickness of the lens is N times the radius of curvature of the convex surface at the axis, where N is the index of refraction of the lens.

4. An optical system comprising a light focusing element for focusing an image in a plane and a unit according to claim 1 located near said plane and oriented to receive the light from said element through the front surface of the unit and to focus it onto the photoconductive layer.

5. A photosensitive unit comprising a rutile lens, the front surface of which is convex, a lead sulfide photoconductive layer in optical contact with the rear surface of the lens and electrodes engaging the layer.

6. A photosensitive unit comprising a crystalline strontium titanate lens, the front surface of which is convex, a lead sulfide photoconductive layer in optical contact with the rear surface of the lens and electrodes engaging the layer.

7. A photosensitive unit comprising a rutile lens, the front surface of which is convex, a lead selenide photoconductive layer in optical contact with the rear surface of the lens and electrodes engaging the layer.

8. A photosensitive unit comprising a crystalline strontium titanate lens, the front surface of which is convex, a lead selenide photoconductive layer in optical contact with the rear surface of the lens and electrodes engaging the layer.

References Cited in the file of this patent

UNITED STATES PATENTS

| | | |
|---|---|---|
| 2,522,987 | Buck | Sept. 19, 1950 |
| 2,676,117 | Colbert et al. | Apr. 20, 1954 |
| 2,676,228 | Shive | Apr. 20, 1954 |
| 2,742,550 | Jenness | Apr. 17, 1956 |
| 2,788,381 | Baldwin | Apr. 9, 1957 |
| 2,861,165 | Aigrain et al. | Nov. 18, 1958 |

FOREIGN PATENTS

| | | |
|---|---|---|
| 655,890 | Germany | Jan. 25, 1938 |

OTHER REFERENCES

"Optical Materials For Instrumentation In the Laboratory and In the Field," by Stanley S. Ballard, Proceedings of the Conference on Infrared Optical Materials, Filters, and Films, OTS–PB 121128, February 1955. Page 85 relied on.